United States Patent [19]
Hehl

[11] Patent Number: 6,155,817
[45] Date of Patent: Dec. 5, 2000

[54] INJECTION-MOULDING UNIT FOR A MACHINE FOR THE INJECTION MOULDING OF PLASTICS

[76] Inventor: Karl Hehl, Arthur-Hehl-Str. 32, D-72290 Lossburg, Germany

[21] Appl. No.: 09/029,131

[22] PCT Filed: Aug. 13, 1996

[86] PCT No.: PCT/DE96/01531

§ 371 Date: Feb. 24, 1998

§ 102(e) Date: Feb. 24, 1998

[87] PCT Pub. No.: WO97/07957

PCT Pub. Date: Mar. 6, 1997

[30] Foreign Application Priority Data

Aug. 25, 1995 [DE] Germany .......................... 195 31 326
Nov. 14, 1995 [DE] Germany .......................... 195 42 453

[51] Int. Cl.$^7$ ................................................. B29C 45/50
[52] U.S. Cl. ...................... 425/574; 425/583; 425/587; 366/78; 366/100
[58] Field of Search ...................... 425/574, 580, 425/582, 583, 587, 594, 589; 366/78, 100, 289

[56] References Cited

U.S. PATENT DOCUMENTS

| | | |
|---|---|---|
| 2,966,070 | 12/1960 | Wise . |
| 4,718,840 | 1/1988 | Inaba et al. .......................... 366/78 |
| 4,802,558 | 2/1989 | Garnett . |
| 5,035,120 | 7/1991 | Quilliou . |
| 5,421,712 | 6/1995 | Laing et al. .......................... 366/78 |
| 5,482,452 | 1/1996 | Hehl .......................... 425/589 |
| 5,855,829 | 1/1999 | Siegrist et al. .......................... 425/574 |

FOREIGN PATENT DOCUMENTS

| | | |
|---|---|---|
| 0 427 866 | 5/1991 | European Pat. Off. . |
| 0 576 925 | 1/1994 | European Pat. Off. . |
| 0 581 401 | 2/1994 | European Pat. Off. . |
| 0 627 289 | 12/1994 | European Pat. Off. . |
| 627289 | 12/1994 | European Pat. Off. . |
| 290685 | 8/1953 | France . |
| 1 043 743 | 4/1959 | Germany . |
| 1216642 | 6/1963 | Germany . |
| 2 039 458 | 2/1972 | Germany . |
| 50 843 | 7/1988 | Germany . |
| 41 15 758 A1 | 11/1992 | Germany . |
| 42 27 336 | 3/1994 | Germany . |
| 44 07 537 A1 | 9/1994 | Germany . |
| 43 24 838 A1 | 1/1995 | Germany . |
| 44 11 651 C1 | 4/1995 | Germany . |
| 43 44 335 | 6/1995 | Germany . |
| 3164219 | 7/1991 | Japan . |
| 577 376 | 7/1976 | Switzerland . |
| 965214 | 7/1964 | United Kingdom . |

*Primary Examiner*—Jill L. Heitbrink
*Attorney, Agent, or Firm*—Venable; George H. Spencer; Robert Kinberg

[57] ABSTRACT

An injection molding unit is provided with a carrier block and an injection bridge, movable towards and away from the carrier block for a relative movement of a feeding means relative to a receiving body. An injection motor drives a plurality of spindle drives for generation of this injection movement. The injection bridge has a sparing or recess, in which the injection motor is placed.

11 Claims, 8 Drawing Sheets

INJECTION-MOULDING UNIT FOR A MACHINE FOR THE INJECTION MOULDING OF PLASTICS

CROSS REFERENCE TO RELATED APPLICATIONS

The present application claims the priorities of the German Patent Applications 195 31 326, filed on Aug. 25, 1995 as well as 195 42 453, filed on Nov. 14, 1995, the subject matter of which are incorporated herein by reference.

BACKGROUND OF THE INVENTION

1. Technical Field

The invention concerns an injection molding unit for a plastics injection molding machine for processing plastifiable materials such as synthetic materials, powdery and ceramic masses of the type including a carrier block; a receiving body fixable at the carrier block and adapted for receiving a feeding means penetrating the carrier block for feeding the plastifiable masses into a mold cavity of a mold; an injection bridge at which the feeding means is seated and which is displaceable towards and away from the carrier block for movement of the feeding means relative to the receiving body; a plurality of spindle drives each having a spindle and a nut as parts movable one against the other, wherein one of the movable parts is seated at the carrier block and the other at the injection bridge; and an injection motor movable together with the carrier block for driving one of the movable parts of the spindle drives at the carrier block.

2. Prior Art

Such an injection molding unit is known from EP-B 427 866. It refers to a two-plate-system comprising a carrier block as a front plate and an injection bridge as a back plate. The plasticizing cylinder is fixed at the carrier block. A feed screw penetrates the carrier block and is rotatably mounted at the injection bridge. The dosing motor is driven via a dosing motor arranged on the injection bridge and projecting in the direction towards the carrier block into the space between the carrier block and the injection bridge. In the same way the injection motor is arranged in the vertical projection between carrier block and injection bridge and drives via a belt drive two spindle drives, which when actuated, move the injection bridge towards and away from the carrier block. This movement at the same time generates the axial movement of the feed screw. The injection motor, however, is arranged so that its overall length determines the minimum distance between carrier block and injection bridge. Since the more the torque increases, basically the overall length of the injection motor increases, and by this construction natural limits are set to a compact design. A drive unit for moving the plasticizing cylinder towards the mold is not integrated in the injection molding unit.

From EP-A 576 925 an injection molding unit is known, wherein a carrier block is seated via spars at the stationary mold carrier. A drive unit formed as a hollow shaft motor for attachment of the nozzles to the injection mold and an injection unit, which generates the axial movement of the feed screw within the plasticizing cylinder during injection, are serially connected at the spars. The rotational motor for the rotation of the feed screw is provided at an injection bridge. This solution certainly makes possible a reliable symmetrical force introduction of the forces generated by the drive unit and the injection unit, however, the serial arrangement of these two units as well as the arrangement of the rotational motor in the direction towards the injection axis results in a large overall length of the injection molding unit, leading to a corresponding enlargement of the whole injection molding machine.

A two-plate-system is also known from DE-C 43 17 998, wherein, however, the drive unit for attachment of the nozzle to the injection mold is integrated into the injection unit. Electromotors serve as drives, which drive the hollow shafts of the drive unit and injection unit which are nested into one another. By this, a space-saving construction is obtained, however, due to the arrangement of the rotational motor at the very back end of the injection bridge an imbalance is produced, since by the nesting of drive unit and injection unit the rotational motor has no counterweight at the injection molding unit. Besides, belt drives have proved to be of short life, susceptible to damage and unprecise.

SUMMARY OF THE INVENTION

Based on this state of the art, it is an object of the invention to create a compact injection molding unit, which is independent from the structural length of the injection motor.

The above and other objects are accomplished in the context of an injection molding unit of the type first mentioned above wherein the injection bridge includes a recess in which the injection motor is disposed so that the injection bridge runs over the injection motor.

The injection bridge includes a recess or bore hole, in which the injection motor is seated, so that carrier block and injection bridge can be driven towards each other to a minimum distance. The overall length of the injection motor thus lies in a parallel relationship relative to the maximum displacement path of the injection bridge by minimization of the otherwise required space for both units one after the other. This minimum distance also does not change in larger machines, since, even when a higher torque of the motor is required and thus its overall length increases, this has no influence on the minimum distance between carrier block and injection bridge. Thus, the injection motor principally is overlapped by the injection bridge.

DETAILED DESCRIPTION OF THE PREFERRED EMBODIMENT

The invention will now be described in more detail by example with reference to the enclosed figures. The illustrated embodiments are merely examples, which should not limit the inventive concept to any particular physical configuration.

Figure 1:
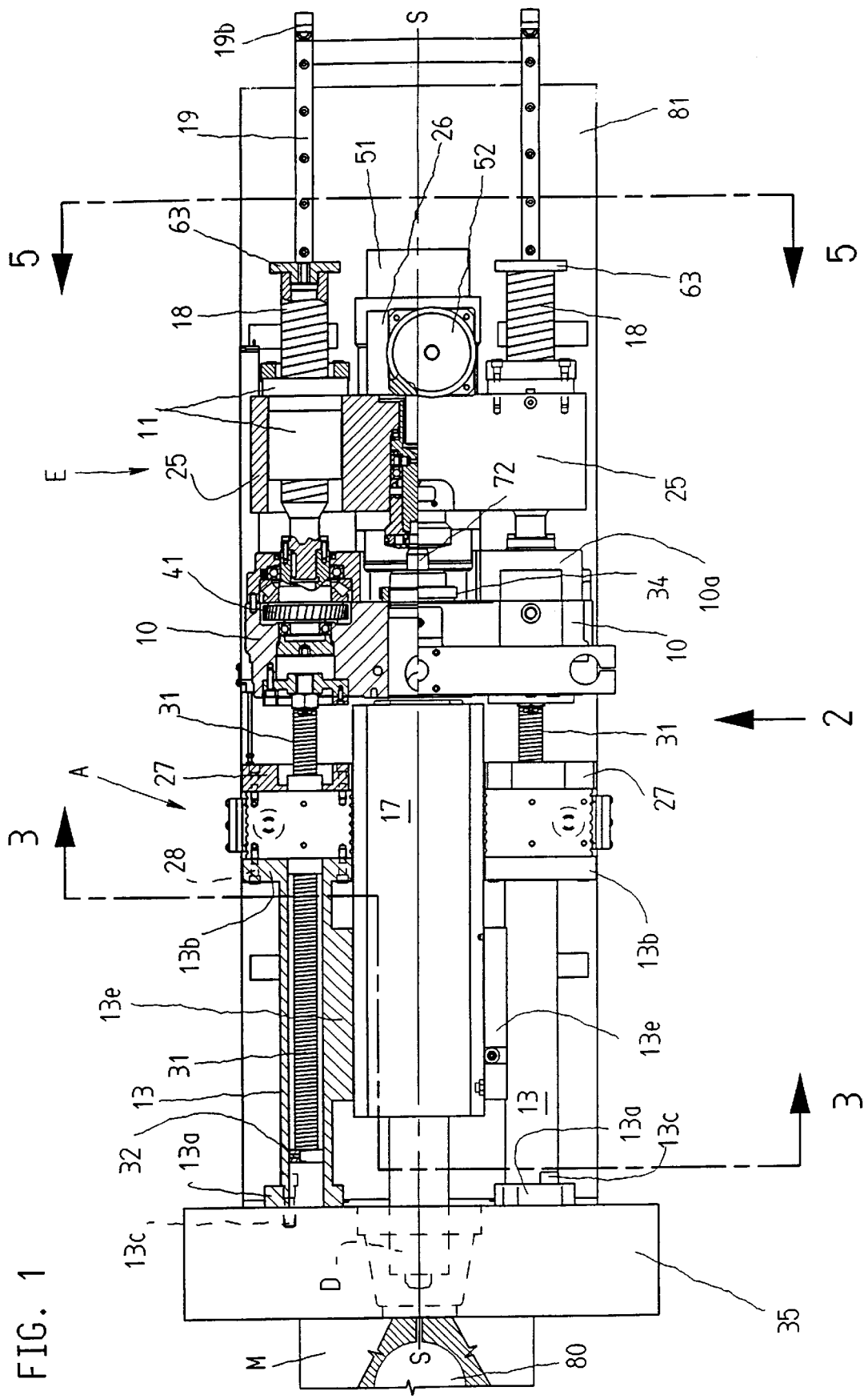
FIG. 1 a top view in partial section on an injection molding unit.
Figure 2:
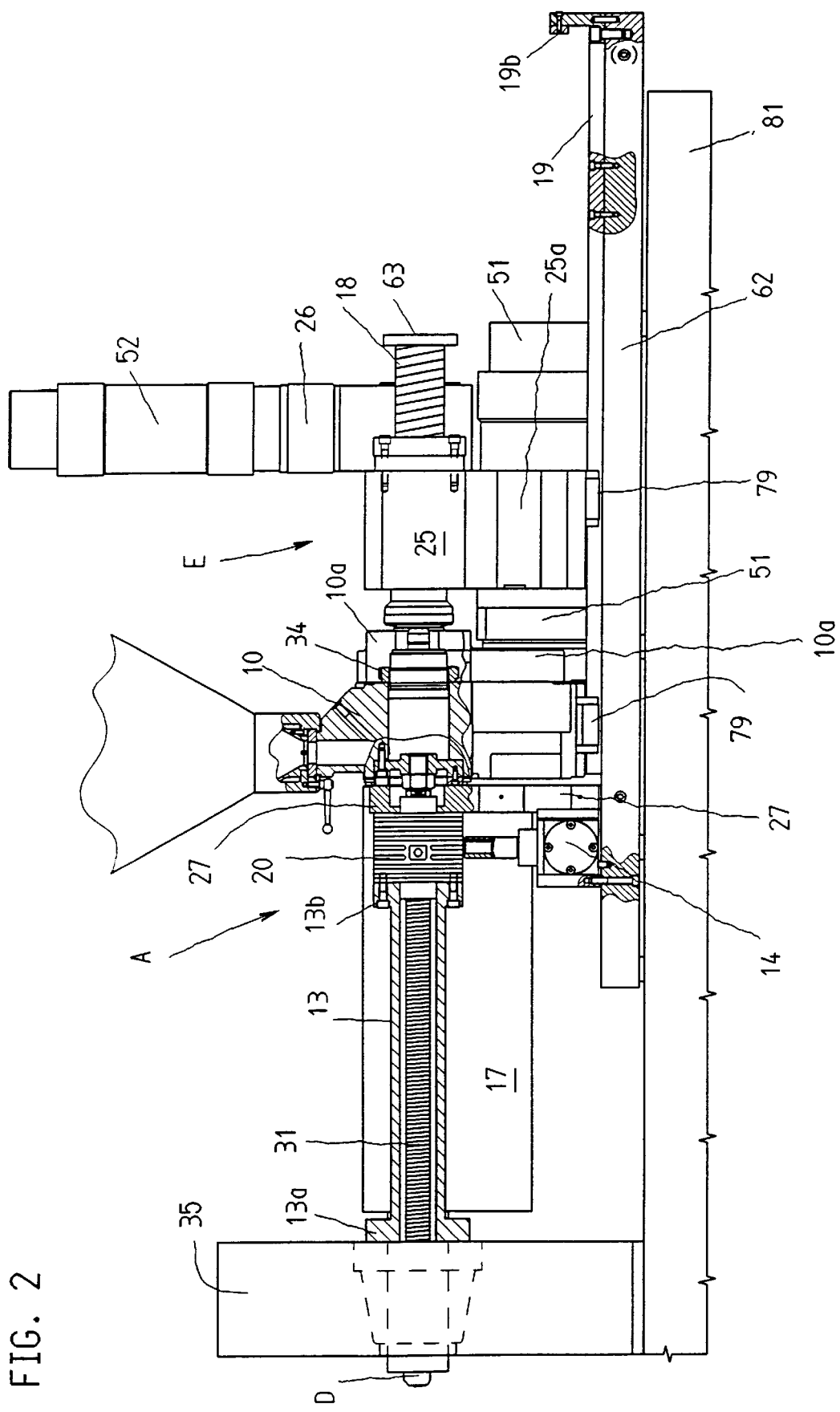
FIG. 2 a side view of the injection molding unit in direction of the arrow 2 of FIG. 1.
Figure 3:
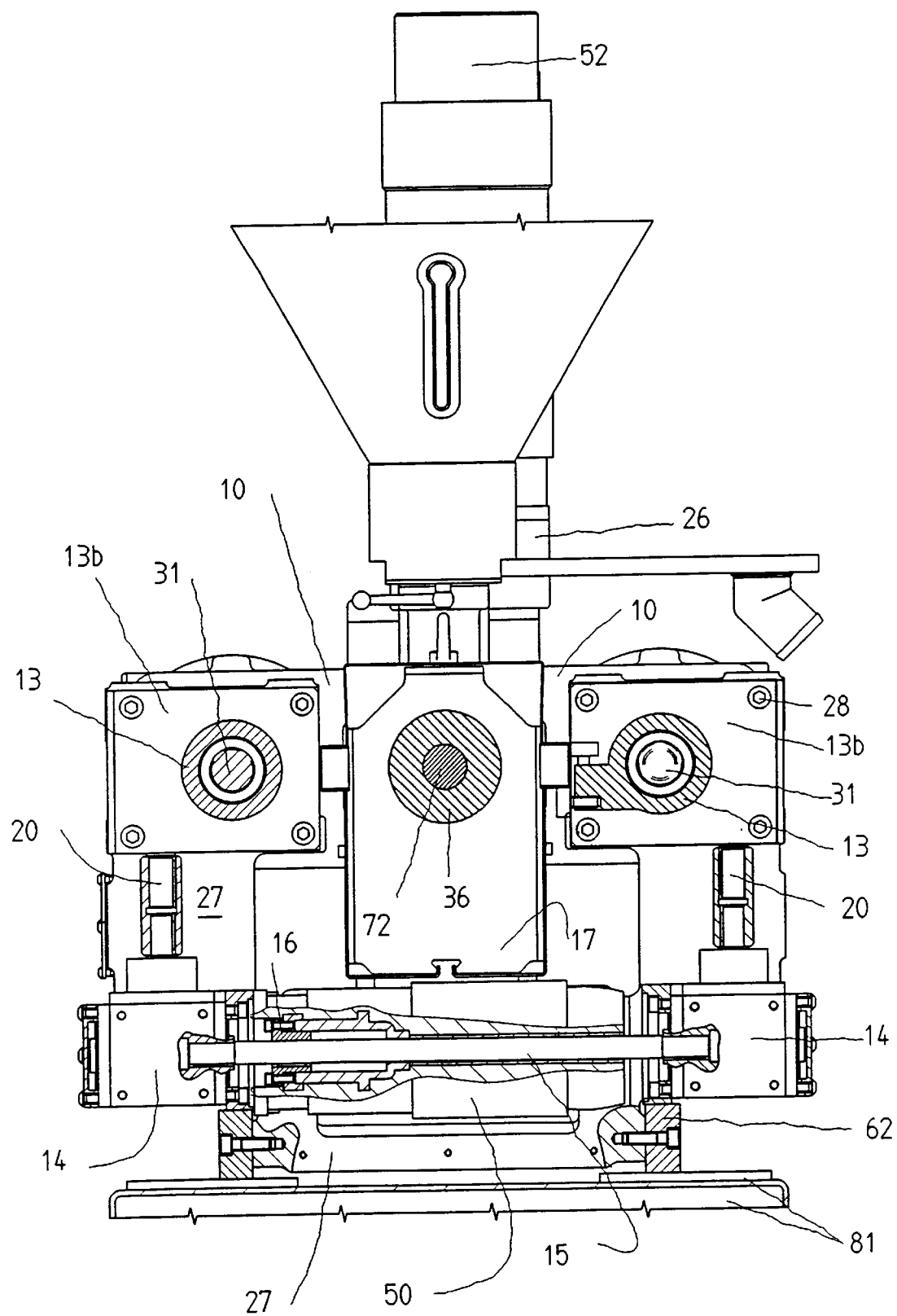
FIG. 3 a section through an injection molding unit according to line 3—3 of FIG. 1.

According to FIGS. 1 and 2 the injection molding unit serves for dosing and injecting plastifiable material such as for example synthetic materials, powdery masses and ceramic masses into a mold cavity 80 of a mold M, which with one part is fixable at a stationary mold carrier 35 of a mold closing unit. The injection molding unit rests on the injection mold by a nozzle D. FIG. 2 shows the construction of the injection molding unit. The injection molding unit has a carrier block 10, by which the injection molding unit essentially is supported on a machine frame 81. The support is effected by interconnection of two strips 62, which on their upper surface are provided with guide rails 19. Nevertheless, the injection molding unit with its support is movable as a structural unit and displaceable for example for injection into the parting plane. On the guide rails 19 in the direction towards the injection axis s—s an injection bridge 25 is movably supported by supports 25a. Carrier block 10 and injection bridge 25 are movably guided along guide shoes 79, wherein the movement backwards is limited by a limit stop 19b.

A receiving body 17 is arranged at the front side of the carrier block 10 facing toward the stationary mold carrier 35. The receiving body 17 receives a plasticizing cylinder 36 in which a feeding means 72 in the form of a feeding piston or a feed screw is arranged. The feeding means penetrates the carrier block 10 and is seated at the injection bridge 25. Thus a relative movement between feeding means 72 and receiving body 17 for feeding the plastifiable mass into the mold cavity 80 of the mold M results from a relative movement of the injection bridge 25 towards the carrier block or away from the carrier block. The plasticizing cylinder 36 is fixable at the back side of the carrier block 10 by a nut 34.

Figure 4:
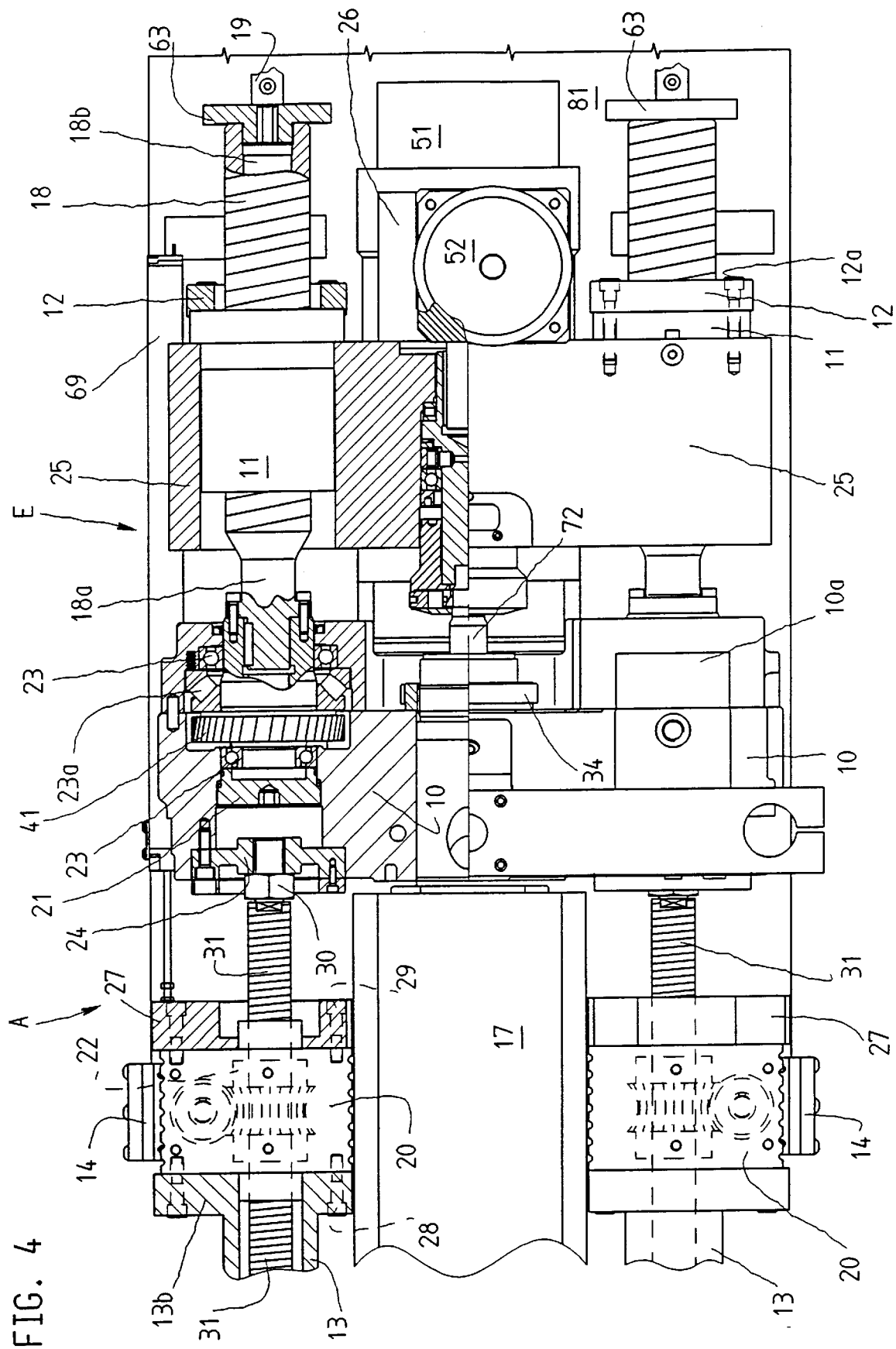
FIG. 4 an enlarged portion of the injection molding unit in a view according to FIG. 1 in the area of the carrier block.

The injection movement is provoked via a plurality of spindle drives E, preferably ball roll spindle drives. According to FIG. 4 the spindle drive has a nut 11 which is arranged, secured against turning, at the injection bridge 25. The nut 11 is fixable at the injection bridge via a retaining plate 12 in connection with pulling bolts 12a and adjustable by corresponding adjustment of the pulling bolts, in order to achieve parallelism of both injection units to a large extent. The spindle 18 of the spindle drive E is rotatably mounted in formings 10a of the carrier block 10. The spindles 18 protrude with an area 18a of reduced diameter from the injection bridge at the side of the injection bridge 25 facing into the direction of the carrier block. This reduced diameter is connected with a gearing 41, via bearings 23, 23a, the driven toothed wheel of which gearing is shown in FIG. 4. This gearing is driven at the carrier block by an injection motor 51. The spindle drive E is fixed at the carrier block 10 by the thrust bearing 21. The spindle 18 and nut 11, however, each can also be operated in a reversed way, so that for example the nut is seated at the carrier block 10 and the spindle at the injection bridge 25. In the same way the function of the spindle and nut at all spindle drives can be reversed by—in case necessary interconnected by roll bodies and rollers—using a tube-like long piece lying outside as 'spindle' with interior profile, into which a short spindle head is inserted as a 'nut' with exterior profile. By this the drive is protected against exterior influences in a most simple way. The spindle 18 itself is a hollow spindle, having a cavity 18b in which a limit stop 63 is fixable.

Figure 5:
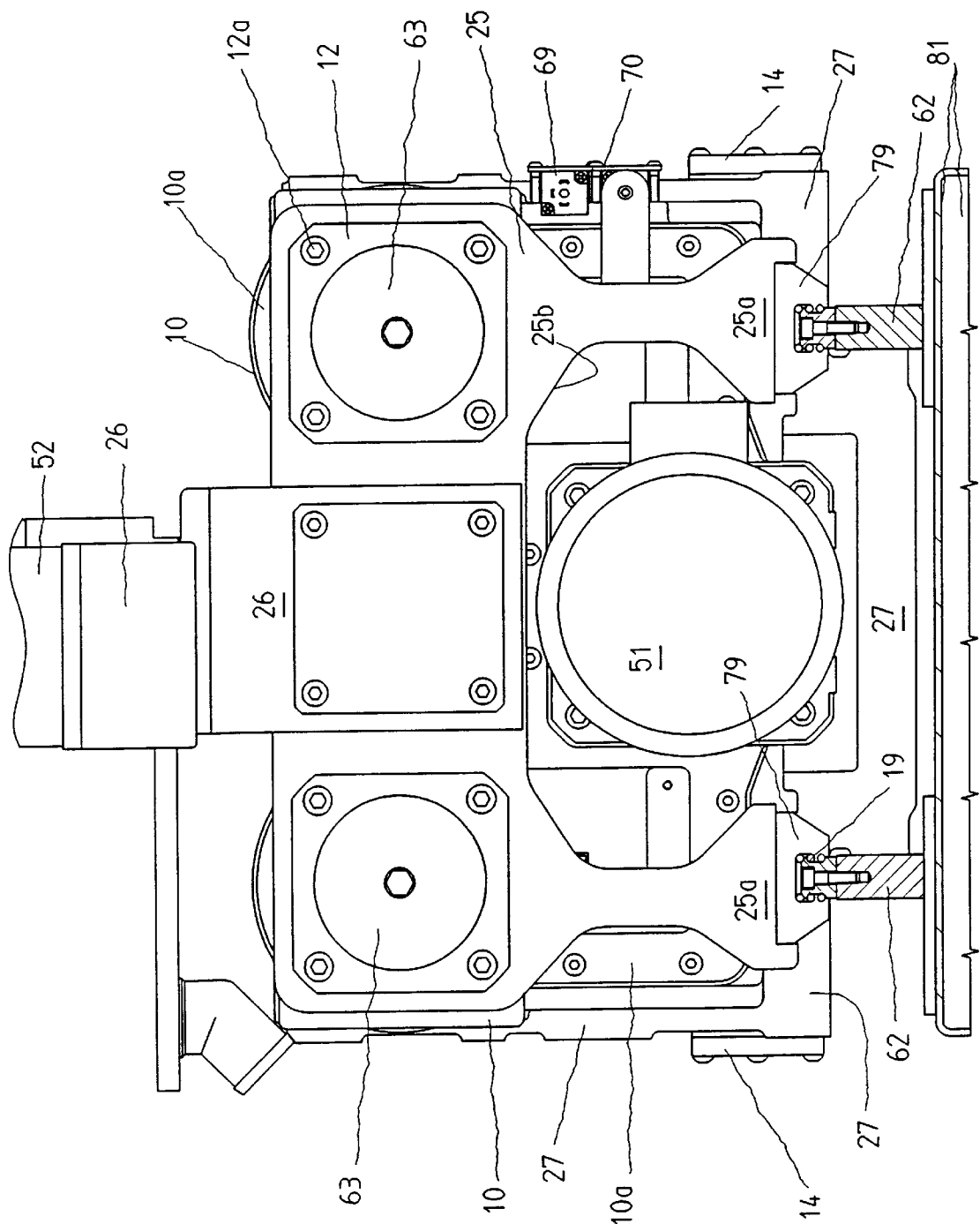
FIG. 5 a view of the injection molding unit according to line 5—5 of FIG. 1.

According to FIG. 5 the injection bridge 25 has a recess 25b in which the injection motor 51 lies, when the feeding means 72 is in its very front position. Instead of the recess it is also possible to provide cutouts or bore holes. It is essential that the injection motor does not hinder the movement of the injection bridge towards the carrier block and away from it. The injection motor 51 is overlapped or run over by the injection bridge 25. For this the injection bridge 25 has the form of an upside-down U. Thus, according to FIG. 5 a projection in the direction to the injection axis s—s results in an arrangement of the injection motor 51 essentially within the carrier block 10, whilst the injection motor 51 is overlapped on both sides by the supports 25a of the injection bridge 25. Since the gearing 41 is mainly arranged in the area between carrier block 10 and forming 10a, the overall length of the carrier block is nearly not increased by this. This way, despite the arrangement of the gearing, the injection bridge 25 can be driven up to the carrier block 10. Thus, injection motor 51 and carrier block 10 together are movable. Nevertheless, the injection motor 51 not only can extend between the carrier block and injection bridge, but also can be arranged outside these two elements.

In the very front position of the feed screw an arrangement approximately according to FIG. 4 is obtained. The end pieces of the spindles 18 of the spindle drive E end approximately in an end region of the injection motor 51. The injection motor 51 lies under the injection bridge 25. Even when the requirements on the torque and thus increasing overall length of the injection motor 51 rise, it can be arranged without problems in this area. According to FIG. 2 the rotational motor 52 for rotation of the feeding means 72 formed as feed screw is arranged above the injection motor. If this rotational motor 52 is arranged transversally to the injection axis s—s, preferably protruding towards the upside, a further shortening of the injection molding unit results, wherein space is made use of, which basically is at free disposal. At the same time the center of gravity of the injection molding unit is displaced further into the center. Via a gearing 26, preferably a bevel gearing, a favorable coupling to the feeding means 72 can be achieved.

Due to the fact that the gearing 41 for driving the spindle drives is arranged on that side of the carrier block 10 facing towards the injection bridge, for driving the spindle drives E, now the other side of the carrier block, which faces in the direction of the stationary mold carrier 35, is free for the coupling of further spindle drives A. These spindle drives serve for attachment of the nozzle D to the mold M. By positioning the spindle drives at the carrier block, the masses to be moved can be kept as low as possible, especially when the drive units for the further spindle drives are stationarily positioned.

The spindles 31 are positioned at the stationary mold carrier 35 in struts or beams into which they plunge. The spindles 31 end in the direction towards the stationary mold carrier 35 with a limit stop 32, which can slide on an inner side of the beams. The beams themselves are formed as exchangeable intermediary pieces 13, which are fixable via a flange 13a at the stationary mold carrier 35 by fixing means 13c and via a flange 13b at a retaining plate 27. The intermediary pieces 13 at the same time can serve as guides 13e for the receiving body 17. These intermediary pieces usually are supplied to the customer in the shortest lengths, which leads to a very compact injection molding unit. However, if the customer is in need of a longer length/diameter relation of the feeding means 72, in order to for example improve the mixing results or the quality of the material to be plastified, these intermediary pieces 13 can be exchanged by longer ones without problems. It is also possible to mount these intermediary pieces at a sleeve support in the area of the stationary mold carrier 35, which is displaceable at the stationary mold carrier 35 laterally or upwards, in order to make the injection molding unit accessible to a gate injection, as is known for example from DE-C 42 27 336.6.

In the illustrated embodiment, the spindles 31 themselves are secured against turning and positioned on the carrier block 10 by a retaining flange 24. The associated nut 22, on the other hand, is rotatably positioned in a gear block 20. At the gear block 20 on the one hand the flange 13*b* is fixed by fixing means 28 and on the other hand a retaining plate 27 is fixed by fixing means 29. The retaining plate 27 is firmly connected with the guide strip 62. From this results a nearly stationary arrangement of retaining plate, gear block 20 and nut 22, as long as the guide strip 62 itself is not moved. As a result, the masses to be moved during the axial movement of the carrier block 10 are also reduced. The movement of the further spindle drive, dimensioned for lower forces for attachment of the nozzle, is made via a drive unit 50, which in the first embodiment is placed under the receiving body 17. The drive unit 50 drives a hollow shaft motor 16, which drives the two gearings 14 via a shaft 15, which in turn drive the nuts 22 of the further spindle drives. In addition, there exists the possibility of a regulation via the linear potentiometer 70 whereby the one side is regulated with respect to its movement, while the other side runs along passively. Via an adjusting nut 30 also the spindles 31 can be adjusted and thus the position of the carrier block 10 with reference to the stationary mold carrier 35.

Figure 6:
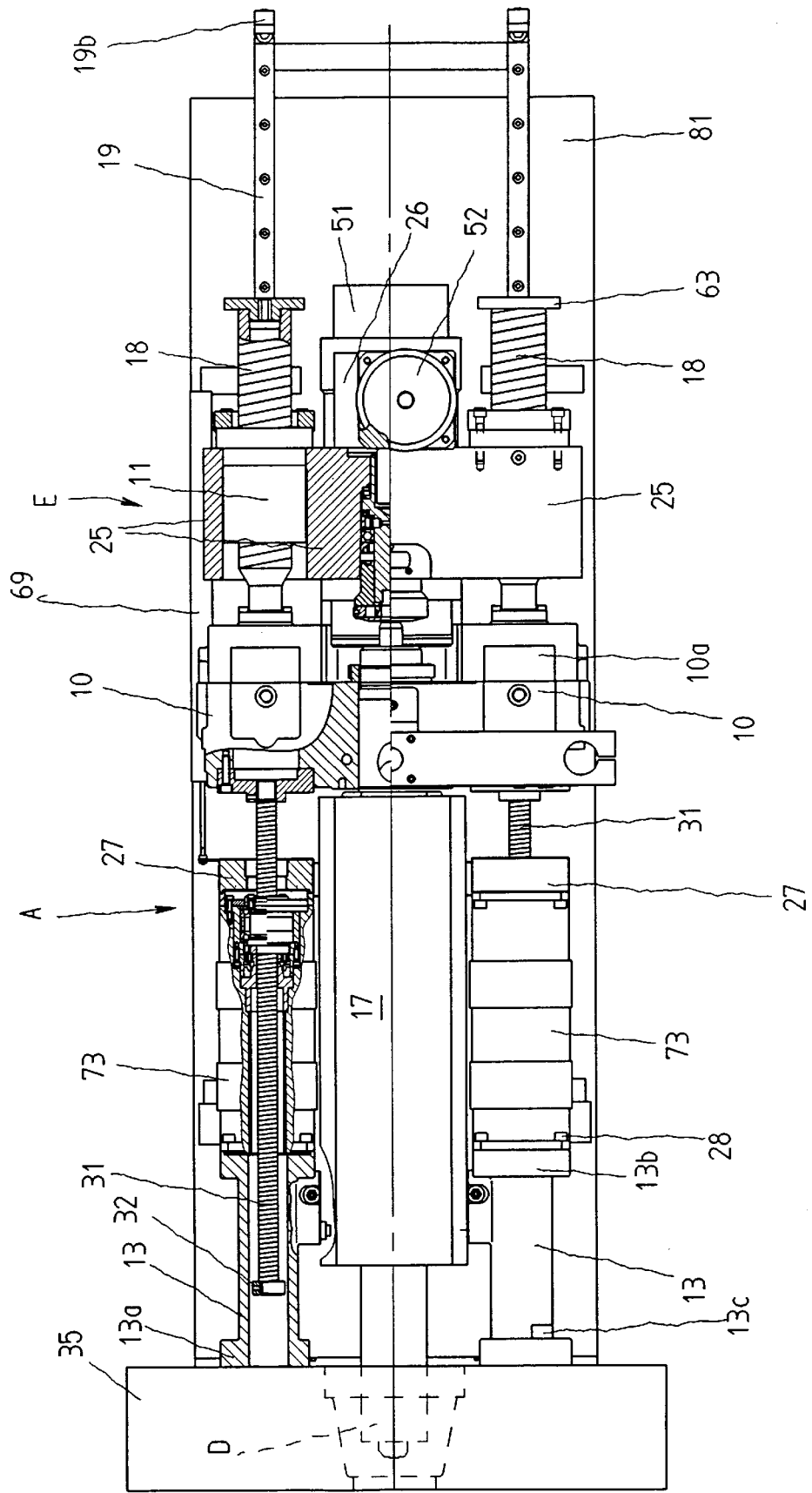
FIG. 6 a view according to FIG. 1 with a drive unit in a further embodiment.
Figure 7:
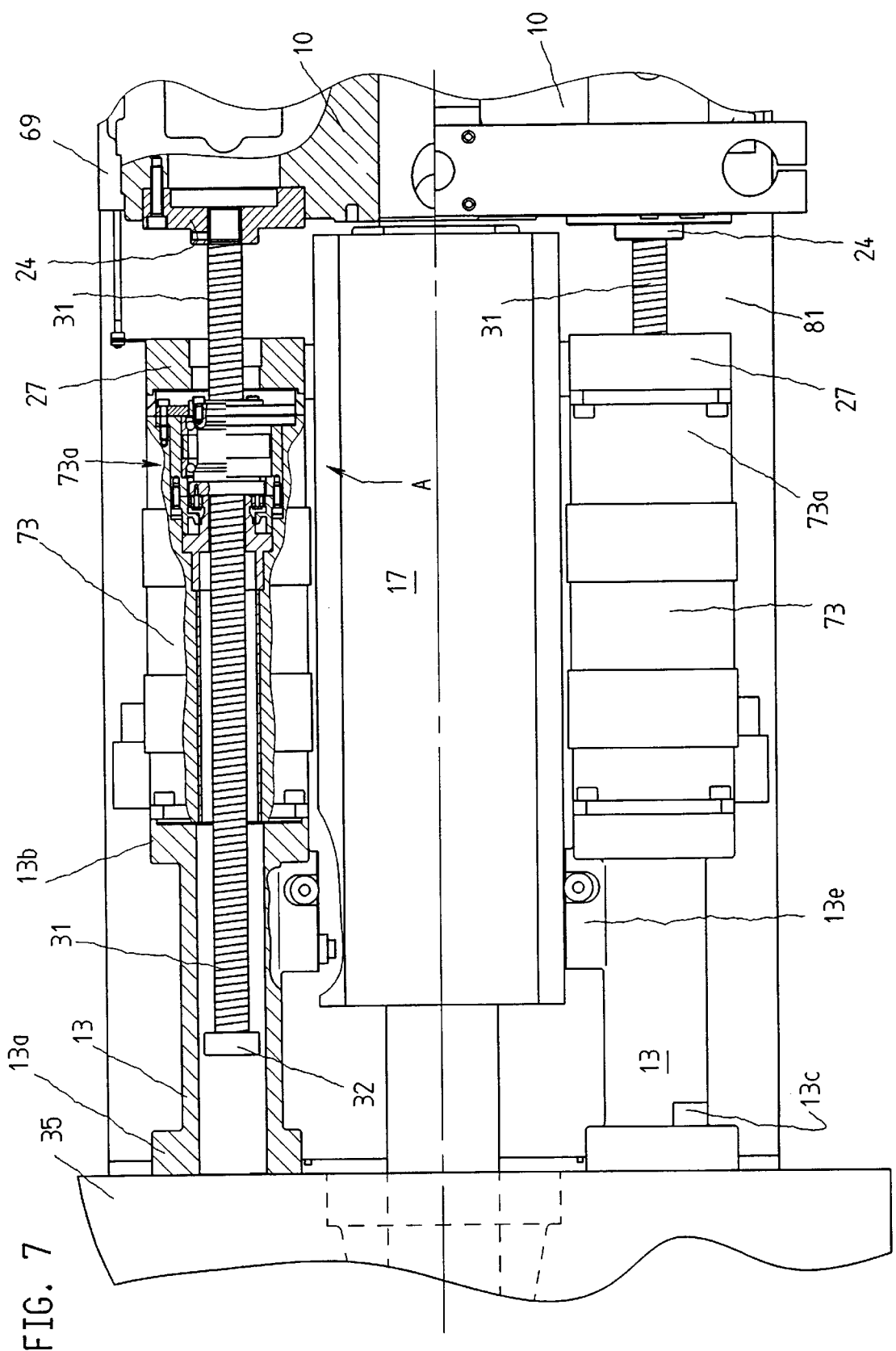
FIG. 7 an enlarged portion of FIG. 6 in the area of the drive unit.
Figure 8:
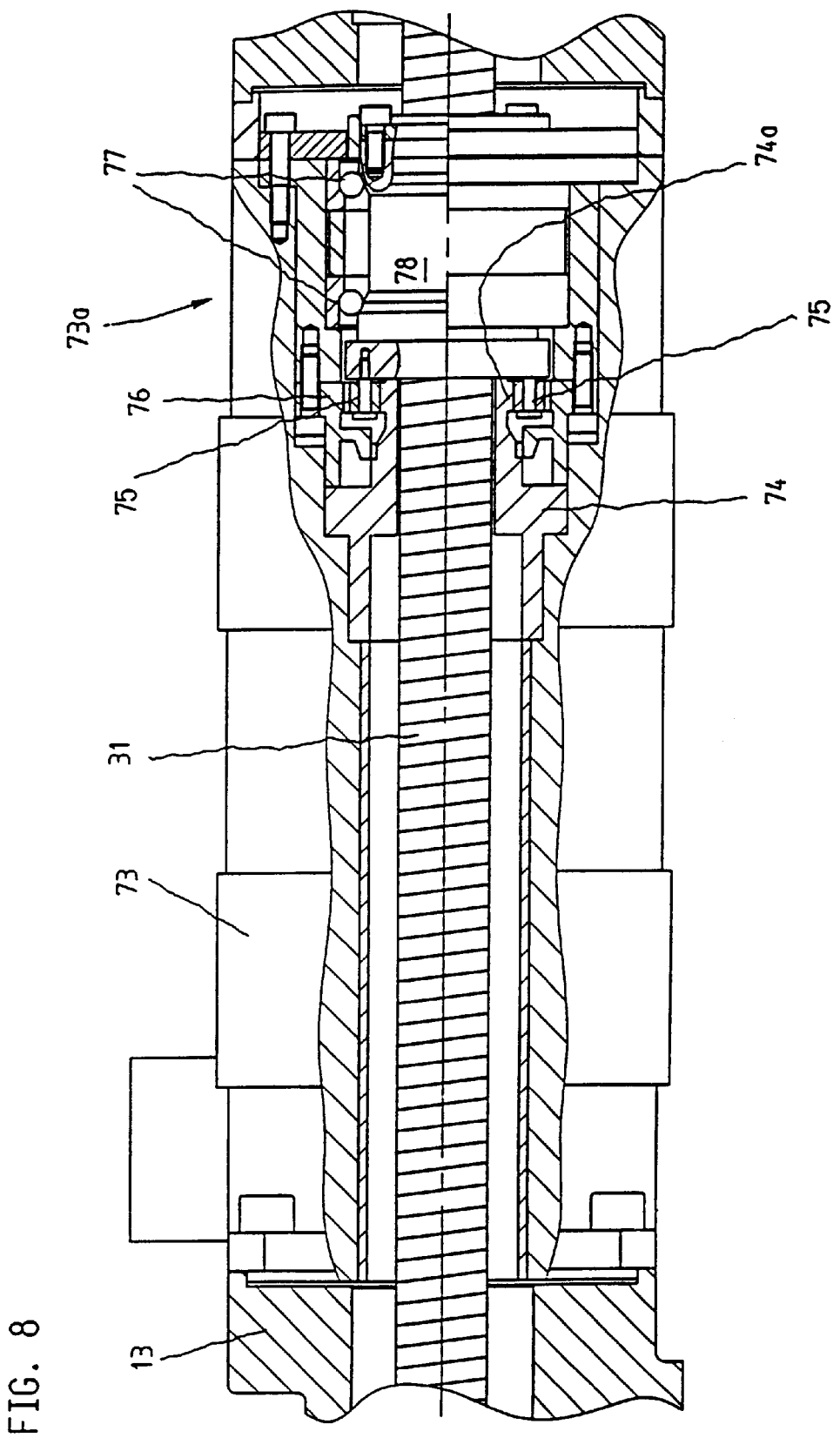
FIG. 8 an enlarged portion of FIG. 7 in the area of the hollow shaft motor.

The compact design and the minimization of masses, however, can also be increased further by substituting the drive unit 50 and the gear block by a hollow shaft motor 73 with planetary gearing 73*a*. Here as well as with the spindle drive E, a regulation can be effected by merely regulating one of the hollow shaft motors 73 by the linear potentiometer 69 while the other runs along synchronously and passively. The corresponding embodiment is shown in FIGS. 6–8. In FIG. 7 the spindle 31 can be seen, wherein in this case a guidance of the limit stop 32 on the interior walls of the intermediary pieces 13 is omitted. According to FIG. 8 the sun wheel 74 simultaneously functions as a rotor which drives the planetary wheel 75 via a pinion region 74*a*. The planetary wheel 75 in turn is in connection with the hollow wheel 76 and drives the spindle nut 78 positioned in a ball bearing 77. The integrated planetary gearing 73*a* makes possible the use of larger spindles, which can be equated to a longer service life of the drive. At the same time a higher thread gradient on the spindles can be achieved, leading to an optimization to the effect that the torque can be set relatively high and at the same time the spindle rotation can be reduced. This also contributes to an increased service life.

Basically it is also possible, not only to exchange the functions of nut and spindle in the spindle drives E and in the further spindle drive A, but also to exchange the arrangement of the intermediary pieces 13 and the further spindle drives A. In addition, further gearings or drive means, such as for example belt drives, plain drives or bevel gearings can be used. Further, instead of the spindle drives, trapezoidal spindle drives, ball spindle drives or gear racks can be used.

It should be understood that this description can be subject to the different modifications, changes and adjustments, all ranging within the area of equivalents of the annexed claims.

I claim:

1. Injection molding unit for a plastics injection molding machine for processing plastifiable masses comprising:
    a carrier block;
    a receiving body fixable at the carrier block and adapted for receiving a feeding means penetrating the carrier block for feeding the plastifiable masses into a mold cavity of a mold;
    an injection bridge at which the feeding means is seated and which is displaceable towards and away from the carrier block for movement of the feeding means relative to the receiving body;
    a plurality of spindle drives each having a spindle and a nut as parts movable one against the other, wherein one of the movable parts is seated at the carrier block and the other at the injection bridge; and
    an injection motor movable together with the carrier block for driving one of the movable parts of the spindle drives at the carrier block, wherein the injection bridge includes a recess in which the injection motor is disposed whereby the injection bridge runs over the injection motor.

2. Injection molding unit according to claim 1, wherein the injection motor, with respect to its overall length, extends parallel to a path of the displacement of the injection bridge.

3. Injection molding unit according to claim 1, wherein the injection bridge has a form of an upside-down U, and the injection motor is projected in a direction of the injection axis, essentially lies within the carrier block and is overlapped by the injection bridge.

4. Injection molding unit according to claim 1, further including guides operatively arranged for guiding the injection bridge on both sides of the injection motor parallel to the injection axis.

5. Injection molding unit according to claim 1, wherein the spindle of the spindle drive is rotatably positioned on the carrier block, and further including a gearing via which the injection motor drives the spindles, and the nut of the spindle drive is positioned at the injection bridge so as to be secured against rotation.

6. Injection molding unit according to claim 5, wherein the gearing is arranged on a side of the carrier block facing in a direction of the injection bridge.

7. Injection molding unit according to claim 1, wherein the feeding means comprise a feed screw fixed at the injection bridge and extending transversely to the injection axis, and further including a rotational motor arranged for rotation of the feed screw.

8. Injection molding unit according to claim 1, further including a stationary mold carrier, beams fixed at the stationary mold carrier and extending toward the carrier block, and a plurality of further spindle drives for attachment of a nozzle to the mold at the stationary mold carrier arranged between the carrier block and the stationary mold carrier, wherein the spindles of the further spindle drives plunge into the beams fixed at the stationary mold carrier.

9. Injection molding unit according to claim 8, further including a retaining plate penetrated by the spindles of the further spindle drives, a spindle nut rotatably position at each retaining plate, and at least one drive unit for the further spindle drives fixed at the retaining plate for driving the rotatably positioned spindle nuts.

10. Injection molding unit according to claim 8, wherein the beams comprise exchangeable intermediary pieces fixable at the stationary mold carrier and at the retaining plate.

11. Injection molding unit according to claim 8, wherein each further spindle drive comprises a hollow shaft motor and an integrated planetary gearing.

\* \* \* \* \*